United States Patent [19]

Kawai et al.

[11] 4,212,197

[45] Jul. 15, 1980

[54] STRAIN GAGE LOAD CONVERTER

[75] Inventors: Masayasu Kawai, Mitaka; Katsumi Ishikawa, Kokubunji, both of Japan

[73] Assignee: Kyowa Electronic Instruments Co., Ltd., Tokyo, Japan

[21] Appl. No.: 1,403

[22] Filed: Jan. 8, 1979

[30] Foreign Application Priority Data

Jan. 24, 1978 [JP] Japan .................................. 53-6536

[51] Int. Cl.² ............................................ G01L 1/22
[52] U.S. Cl. ................................. 73/141 A; 177/211; 338/5
[58] Field of Search ..................... 73/1 B, 141 A, 765; 177/211, 229; 338/5

[56] References Cited

U.S. PATENT DOCUMENTS

| 2,866,059 | 12/1958 | Laimins | 73/141 AX |
| 3,576,128 | 4/1971 | Lockery | 73/141 A |
| 4,128,001 | 12/1978 | Marks | 73/141 A X |

*Primary Examiner*—Charles A. Ruehl
*Attorney, Agent, or Firm*—Owen, Wickersham & Erickson

[57] ABSTRACT

A strain gage load converter having a parallelogram shaped beam having strain gages on the top and bottom surfaces of the beam. These gage mounting surfaces are made reentrant concave shaped in order to eliminate occurrence of measurement loss due to lateral shift of load point against the main axis of the beam.

3 Claims, 12 Drawing Figures

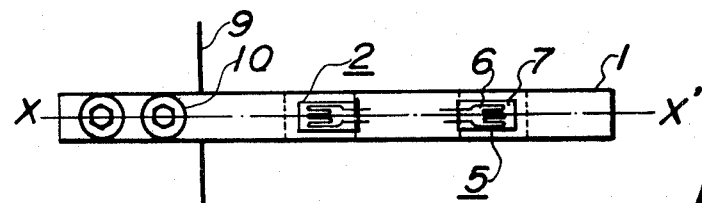
FIG_1a PRIOR ART
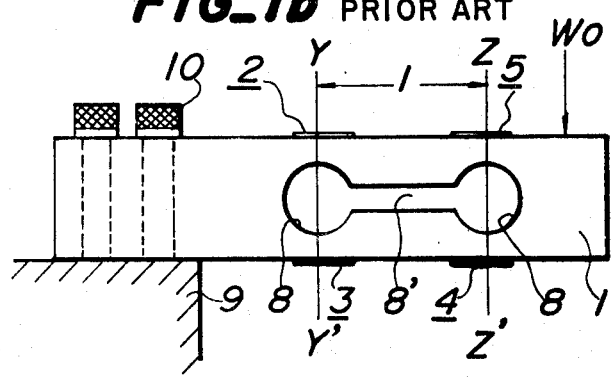 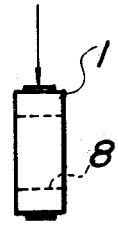
FIG_1b PRIOR ART  FIG_1c PRIOR ART
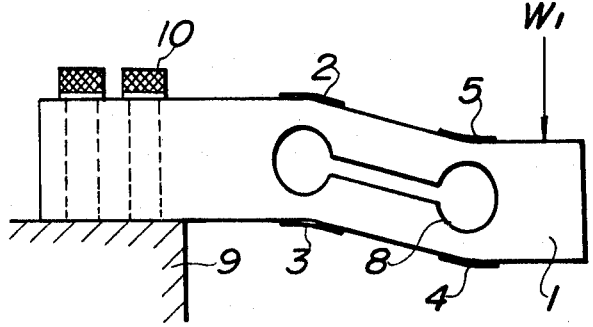 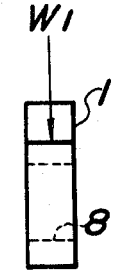
FIG_2a PRIOR ART  FIG_2b PRIOR ART

FIG_3 PRIOR ART
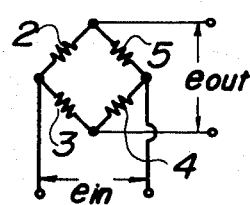
FIG_4 PRIOR ART
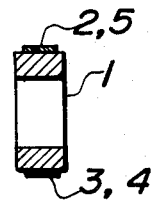
FIG_5 PRIOR ART
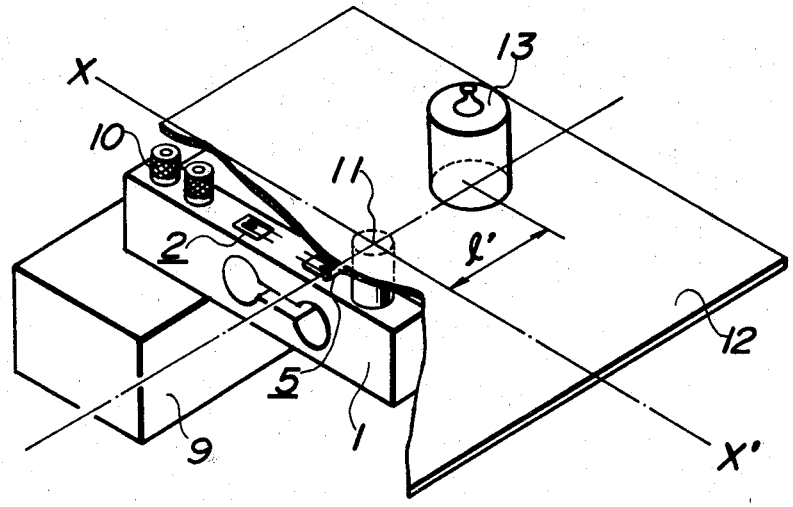

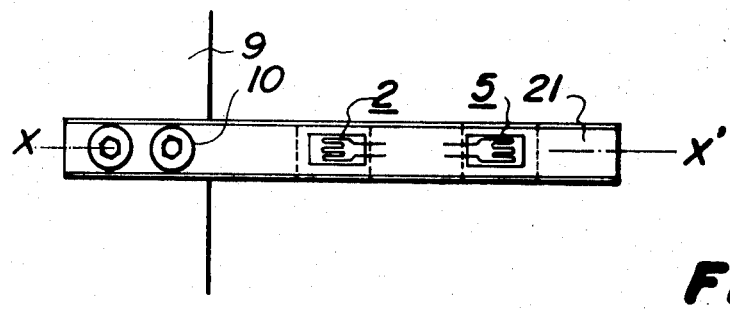
FIG_6a
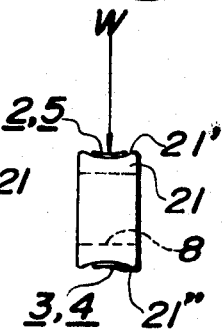
FIG_6c
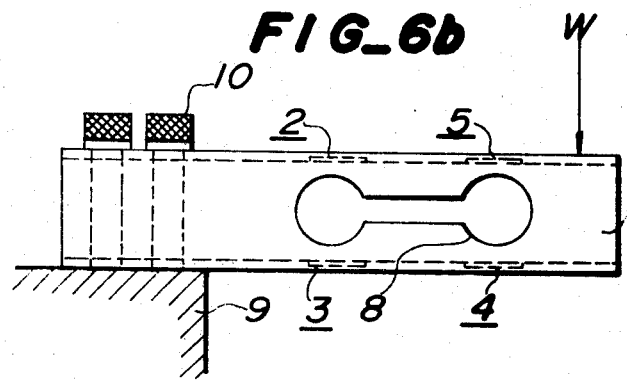
FIG_6b
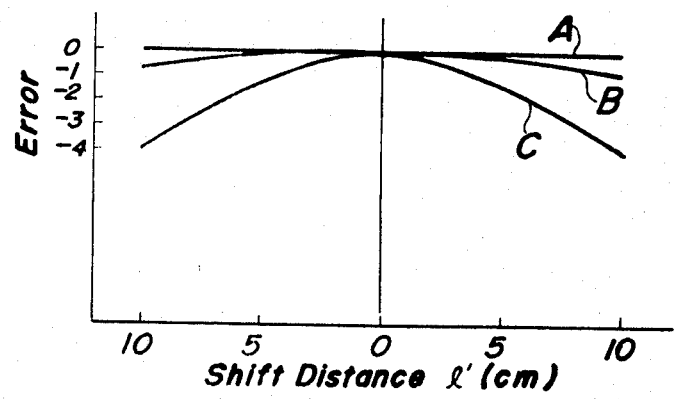
FIG_7

STRAIN GAGE LOAD CONVERTER

BACKGROUND OF THE INVENTION

1. Field of the Invention

The present invention relates to a parallelogram shaped or a straight beam type strain gage load converter, which is able to deliver an accurate measurement value even when the load point is located at a position apart from the main axis of the beam of the load converter.

2. Description of the Prior Art

In a conventional load converter of this type, four strain gages are mounted at positions where the concentrating stress occurs. The strain gages are electrically connected in series to form a Wheatstone bridge. If a load is applied to the load converter, it deforms by the applied weight. This deformation causes strain in the converter. By arranging the bridge circuit to balance at no load condition, the deformation by the applied weight is detected using an unbalanced condition of the bridge. The amount of unbalance is in proportion to the applied weight, so that the applied weight is detected from an electric output of the bridge.

In such a conventional load converter, the cross-section of the beam is generally square or rectangular shape. This type of conventional load converter has a drawback in that a measurement error may result according to location of application of the load and thus the load point should be limited only at a certain area. This means that although no measurement error results by shifting the load point along the main axis of the converter, a big measurement error results by shifting the load point normal to the direction of the main axis.

Recently such a load converter has been used in an electronic balance, in which a load converter is provided together with a mount for the load plate and the load plate is directly secured to the mount. In such an electric balance we noted disadvantages in that although no measurement error causes by shifting the load along the main axis of the plate which is parallel to the main axis of the load converter, a big measurement error results by shifting the load point in a direction normal thereto.

The present invention has for its object to mitigate the aforementioned disadvantage of the conventional load converter.

BRIEF DESCRIPTION OF THE DRAWINGS

FIGS. 1a, 1b and 1c show a conventional parallelogram shaped beam type strain gage load converter, in which FIG. 1a is a plan view, FIG. 1b is a side view and FIG. 1c is an end view;

FIGS. 2a and 2b are principle diagrams for showing deformation of the beam as shown in FIGS. 1a and 1b by an applied load and causing compression or expansion of the strain gages fixed thereon;

FIG. 3 is a basic measuring circuit of the parallelogram shaped beam type strain gage load converter;

FIG. 4 is a cross-sectional view taken at Y—Y' or Z—Z' of FIG. 1b;

FIG. 5 is a perspective view partly in cross-section of a balance having a strain gage load converter such as shown in FIGS. 1a–1c and a weight plate;

FIGS. 6a, 6b and 6c are one embodiment of strain gage load converter according to the present invention, in which FIG. 6a is a plan view, FIG. 6b is a side view and FIG. 6c is an end view; and FIG. 7 shows characteristic diagram of the strain gage load converter of the present invention in comparison with those of prior art and an experimental one.

DETAILED EXPLANATION OF THE PREFERRED EMBODIMENTS

In order to give a more clear understanding of the present invention, a conventional load converter will be explained at first by referring to the attached drawings.

FIGS. 1a to 1c show a conventional load converter. As shown in these figures, a cantilever type beam 1 is mounted on a base 9 by a suitable means such as screws 10 and four strain gages 2, 3, 4, and 5 are fixed on the beam 1. As can be better seen from FIG. 1b, the gages 2 and 5 are mounted on the top surface of the beam 1 and the gages 3 and 4 are mounted on the bottom surface of the beam 1. The beam 1 is provided with two round holes 8 being connected with a straight cut 8'. By such an arrangement, concentrated stresses occur at locations where the four strain gages 2 to 5 are fixed when a load $W_1$ is applied at the free end of the cantilever type beam 1 as shown by an arrow $W_1$ in FIG. 2a.

Each of the strain gages is formed of a base 7 provided with resistive element 6 as shown only briefly in FIG. 1a. The resistive elements of the gages 2 to 5 are connected in series to form a Wheatstone bridge circuit as shown in FIG. 3. To this bridge circuit, an input voltage $e_{in}$ is applied and an output voltage $e_{out}$ is derived therefrom.

When the load $W_1$ is applied as shown in FIG. 2a, the beam 1 deforms as illustrated. In this case gages 2 and 4 are pulled and that 3 and 5 are compressed. By the strain thus occurred, resistance values vary, namely the resistance value increases or decreases depending on the location of the gage. The bridge circuit of FIG. 3 is arranged to balance at no load condition. The circuit becomes unbalanced condition when loaded and the unbalance amount is in proportion to the applied load. By measuring the unbalanced amount electrically the applied load $W_1$ can be measured.

In such a conventional load converter, the general cross-section of the cantilever type beam 1 at location Y—Y' or Z—Z', where the strain gages are mounted, is square or rectangular shaped as shown in FIG. 4. The inventors noted this shape of the beam results a measurement error. Namely, in such a conventional load converter, a measurement error results depending on the load applying point so that the location at where the load is applied is limited. In more detail, there will be no output variation when the load applying point or the loading point is shifted along the main axis X—X' of the beam as shown in FIG. 1. However, a big measurement error might be caused when the loading point is shifted in a direction normal to said main axis X—X'.

FIG. 5 shows a practical application of such a load converter to an electronic balance. This balance comprises a load converter 1 of the aforementioned type to which a support disk 12 is directly mounted with an aid of a disk mount portion 11. In this device, there will be no error when the applied weight 13 is moved along the main axis X—X' but an error will result when the applied load 13 is placed at a position apart from the main axis X—X' by a distance l' as shown in the figure. This has been a disadvantage of the conventional device in that an accurate measurement is not obtained for all the load point on the support disk 12.

As has been mentioned above the present invention is to mitigate this disadvantage.

FIGS. 6a, 6b and 6c show the structure of a load converter especially the beam portion thereof made in accordance with the present invention.

In these figures, 21 is the beam and 2, 3, 4 and 5 are strain gages adhered along the main axis X—X' of the beam 21 of the load converter. As has been explained in the foregoing by referring to FIG. 1, in the conventional load converter, when the load point is shifted in a direction along the main axis X—X', there will be no measurement error due to the shift of the load point since an overall moment of $W_0l$ occurs at the location where the strain gages are mounted. However, there will be a substantial measurement error when the load point is shifted in a direction normal to the main axis X—X'. In this case, torsional and bending force are applied to the beam 1.

According to the present invention, the top and the bottom surfaces of the beam 21 is made smoothly reentrant shaped except both edge portions as is shown more clearly in FIG. 6c by 21' and 21". The strain gages 2 to 5 are fixed on these concave surfaces 21' and 21". The cross-section of the concave surfaces 21' and 21" may be circular shaped.

By this arrangement, the aforementioned measurement error in the conventional type device may be avoided.

The beam 21 as shown in FIGS. 6a to 6c is used to form an electronic balance equipment in the same manner as of the conventional one as shown in FIG. 5 and mounted with a support plate 12 by means of a disk mount portion 11.

FIG. 7 shows characteristic curves showing relation between the measurement error in the ordinate and the distance l' apart from the main axis X—X' of the beam 1 in the abscissa. In the FIG. 7, a curve A corresponds to a case when the beam 21 is made in accordance with the present invention as shown in FIGS. 6a to 6c. In the same figure, a curve B corresponds to a case when a parallelogram shaped beam load converter as shown in FIGS. 1a to 1c is used. This curve is shown for a comparison purpose. Further a beam having a convex shaped cross-section just opposite to FIG. 6c had been tried and the error characteristic had been measured. This result is shown by a curve C in FIG. 7.

As can be seen from FIG. 7, by suitably arranging the concave shaped cross-section of the beam 21, a load converter substantially free of measurement error against the lateral shift of the load point from the main axis is obtained. By using the load converter, it is possible to mount the support plate on the beam directly so that a highly accurate electronic balance is obtained.

As has been explained in the foregoing, the load converter of the present invention can avoid the disadvantages of the conventional load converter by simply modifying the shape of the surfaces along the main axis of the beam to be reentrant and concave shaped on which the strain gages are mounted. This means that the load converter according to the present invention can utilize the merit of the conventional beam type load converter unchanged but eliminating the measurement error disadvantages. Thus the load converter of the present invention can very conveniently be used in an electronic balance.

In the cross-sectional view of FIG. 6c, the reason to make both edge portions to be not acute angle and to have a smooth shaped is to avoid an occurrence of a concentrated stress.

What is claimed is:

1. A strain gage load converter of a parallelogram shaped beam type characterized in that gage mounting surfaces of the beam are made concave shaped along a main axis of the beam so that measurement error of the load converter due to shift of a load point in a direction normal to said axis can be made substantially negligible.

2. A strain gage load converter as claimed in claim 1, wherein the gage mounting surfaces are made smoothly reentrant shaped except both edge portions, and these edge portions are made to form small convex surfaces so as to eliminate acute edges in order to avoid occurrence of concentrated stress therein.

3. A strain gage load converter as claimed in claim 1, wherein the concave shaped gage mounting surfaces have circular cross-section.

* * * * *